United States Patent
Herman et al.

(10) Patent No.: US 12,449,283 B2
(45) Date of Patent: Oct. 21, 2025

(54) NON-CONTACT VOLTAGE TESTER LIGHTBULB SOCKET ADAPTER

(71) Applicant: Robert Bosch GmbH, Stuttgart (DE)

(72) Inventors: Gregory Herman, Elk Grove, IL (US); Jeremy Rubens, Palatine, IL (US); Caitlyn Miklasz, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 18/068,866

(22) Filed: Dec. 20, 2022

(65) Prior Publication Data
US 2023/0213364 A1 Jul. 6, 2023

Related U.S. Application Data

(60) Provisional application No. 63/295,378, filed on Dec. 30, 2021.

(51) Int. Cl.
*G01D 11/30* (2006.01)
*G01R 19/155* (2006.01)

(52) U.S. Cl.
CPC ........... *G01D 11/30* (2013.01); *G01R 19/155* (2013.01)

(58) Field of Classification Search
CPC .............................. G01D 11/30; G01R 19/155
See application file for complete search history.

(56) References Cited

U.S. PATENT DOCUMENTS

| | | | | |
|---|---|---|---|---|
| 4,695,803 A * | 9/1987 | Rue | ....................... | G01R 15/186 |
| | | | | 315/129 |
| 5,179,339 A * | 1/1993 | Volk, Jr. | ................. | H01K 3/305 |
| | | | | 324/403 |
| 5,285,163 A * | 2/1994 | Liotta | .................... | G01R 31/58 |
| | | | | 324/508 |
| 5,323,116 A * | 6/1994 | Atria | ....................... | G01R 31/50 |
| | | | | 340/653 |
| 5,557,207 A * | 9/1996 | Duve | ..................... | G01R 31/24 |
| | | | | 324/133 |
| 5,877,618 A * | 3/1999 | Luebke | ..................... | G01R 1/07 |
| | | | | 340/815.73 |
| 6,097,191 A * | 8/2000 | Jones, Jr. | ............. | G01R 31/245 |
| | | | | 324/414 |
| 6,424,139 B2 * | 7/2002 | Bystrom | .............. | G01R 19/155 |
| | | | | 324/133 |
| 6,710,553 B2 * | 3/2004 | Logan | .................... | H05B 47/17 |
| | | | | 315/56 |
| 7,002,264 B2 * | 2/2006 | Logan | .................... | H05B 47/17 |
| | | | | 307/115 |
| 8,723,434 B2 * | 5/2014 | Watson | ................ | H05B 47/105 |
| | | | | 362/183 |
| 9,078,308 B2 * | 7/2015 | Williams | ............. | H05B 47/175 |
| 9,146,262 B2 * | 9/2015 | Lamoreux | ............ | G01R 19/155 |

(Continued)

*Primary Examiner* — Hoi C Lau
(74) *Attorney, Agent, or Firm* — David Kovacek; Maginot, Moore & Beck LLP

(57) ABSTRACT

A lightbulb socket adapter for a hand-held non-contact voltage tester is disclosed. The adaptor having a first engagement feature configured to at least partially couple with a hand-held non-contact voltage tester and a second engagement feature configured to be at least partially disposed within a lightbulb socket. A first embodiment has an adaptor with a male Edison screw, and a second embodiment has an adaptor with protrusions on elastically deformable limbs configured to snap down into a female Edison screw and unscrew out.

20 Claims, 2 Drawing Sheets

(56) References Cited

U.S. PATENT DOCUMENTS

| | | | | |
|---|---|---|---|---|
| 9,307,599 B2* | 4/2016 | Williams | ............. | F21S 9/024 |
| 9,363,871 B2* | 6/2016 | Williams | ............. | H05B 47/185 |
| 10,775,409 B2* | 9/2020 | Worones | ............. | G01R 15/12 |
| 11,017,970 B2* | 5/2021 | Stonebraker | ............. | H01R 24/60 |
| 2002/0180367 A1* | 12/2002 | Logan | ............. | H05B 47/17 |
| | | | | 315/119 |
| 2004/0246638 A1* | 12/2004 | Davies | ............. | H01H 83/20 |
| | | | | 361/42 |
| 2005/0001563 A1* | 1/2005 | Logan | ............. | H05B 47/17 |
| | | | | 315/291 |
| 2007/0047161 A1* | 3/2007 | Mills | ............. | G01R 31/3277 |
| | | | | 361/42 |
| 2010/0259196 A1* | 10/2010 | Sadwick | ............. | H02M 3/33515 |
| | | | | 315/309 |
| 2010/0261367 A1* | 10/2010 | Billman | ............. | H01R 13/516 |
| | | | | 439/271 |
| 2011/0012433 A1* | 1/2011 | Parsons | ............. | H05B 47/19 |
| | | | | 315/159 |
| 2011/0093234 A1* | 4/2011 | Williams | ............. | H01H 47/002 |
| | | | | 324/750.3 |
| 2013/0278162 A1* | 10/2013 | Watson | ............. | H05B 45/3725 |
| | | | | 362/183 |
| 2014/0028210 A1* | 1/2014 | Maxik | ............. | F21S 9/024 |
| | | | | 362/640 |
| 2014/0265845 A1* | 9/2014 | Williams | ............. | H05B 47/17 |
| | | | | 315/86 |
| 2014/0265905 A1* | 9/2014 | Ray | ............. | F21K 9/232 |
| | | | | 315/210 |
| 2015/0091451 A1* | 4/2015 | Williams | ............. | H05B 47/17 |
| | | | | 315/160 |
| 2015/0116084 A1* | 4/2015 | Yeara | ............. | G07C 9/22 |
| | | | | 340/5.65 |
| 2015/0296586 A1* | 10/2015 | Williams | ............. | H05B 47/175 |
| | | | | 315/161 |
| 2016/0209899 A1* | 7/2016 | Brantner | ............. | H04L 12/12 |
| 2016/0327599 A1* | 11/2016 | Wiesemann | ............. | G01R 19/155 |
| 2017/0172128 A1* | 6/2017 | Mann | ............. | H02J 7/0042 |
| 2019/0279833 A1* | 9/2019 | Stonebraker | ............. | H01R 24/60 |
| 2021/0276175 A1* | 9/2021 | Kratish | ............. | B25B 27/14 |
| 2023/0130052 A1* | 4/2023 | Shareef | ............. | G01R 31/3274 |
| | | | | 324/424 |
| 2023/0213364 A1* | 7/2023 | Herman | ............. | G01R 19/155 |
| | | | | 340/660 |
| 2023/0304648 A1* | 9/2023 | Cespedes | ............. | F21V 17/06 |

* cited by examiner

NON-CONTACT VOLTAGE TESTER LIGHTBULB SOCKET ADAPTER

TECHNICAL FIELD

This disclosure relates to non-contact voltage testers, and more specifically to an adapter that may be used with a non-contact voltage tester to test lightbulb sockets.

BACKGROUND

Non-contact voltage testers, also known to replace the term non-contact with no-touch or contactless, sometime replacing voltage with electric, AC, or live wire, as well as swapping out tester with detector, checker, sniffer, or pen, are common nomenclatures for the non-contact voltage testers as used in this application and as described below.

Most non-contact voltage testers rely on capacitive current and essentially detect the changing electric field around alternating current (AC) energized objects. AC is an electric current which periodically reverses direction and changes its magnitude continuously with time in contrast to direct current (DC) which flows only in one direction. This allows for no direct metallic contact with the circuit to be required, thus the nomenclature of non-contact. This is not intended as a misnomer, as the outer probe of the non-contact voltage tester is often put into direct contact with a sheathed wire.

When the sensor of the device is placed near a live conductor, a capacitive voltage divider is established comprising the parasitic capacitance between the conductor and the sensor and between the sensor and the ground. If the target conductor is live/energized, the user receives an indication. The indication may be an indicator LED lighting up or a speaker emitting an audible noise. Additional energy to light the lamp and power the amplifier is often supplied by a small internal battery.

When the tester detects current flowing it indicates the presence of voltage. Some amplified testers will give a stronger indication (brighter light or louder buzz) to gauge relative strength of the detected field, thus giving some clues about the location of an energized object. Other testers give only a simple on/off indication of a detected electric field. Professional-grade testers will also have a feature to reassure the user that the battery and lamp are working.

Unlike tong ammeters which sense changing magnetic fields, these detectors can be used even if no current is flowing through the wire in question, because they sense the alternating electric field radiating from the AC voltage on the conductor. A non-contact tester which senses electric fields cannot, however, detect voltage inside shielded or armored cables (a fundamental limitation due to the Faraday cage effect). Another limitation is that direct current (DC) voltage cannot be detected by this method, since DC current does not pass through capacitors (in the steady state), so the tester would not be activated by a DC current.

Non-limiting examples of non-contact voltage testers like the ones utilized with these teachings are the Fluke IAC-AI-II, Neoteck Professional Non-Contact voltage tester, Klein Tools NCVT-6, Klein Tools NCVT-3P, Milwaukee Dual-Range 2203-20, Greenlee GT-16, and SomovWorld Non-Contact Voltage Detector E-VD6910.

A lightbulb socket, also known as a light socket, lamp socket, or lampholder, is a device which mechanically supports and provides electrical connections for a compatible electric lamp, such as a light bulb. Sockets allow bulbs to be safely and conveniently replaced (re-lamping). There are many different standards for lampholders, including early de facto standards and later standards created by various standards bodies. Many of the later standards conform to a general coding system in which a socket type is designated by a letter or abbreviation followed by a number.

Edison screw (ES) is a standard lightbulb socket for electric light bulbs. It was developed by Thomas Edison, patented in 1881, and was licensed in 1909 under General Electric's Mazda trademark. The bulbs have right-hand threaded metal bases (caps) which screw into matching threaded sockets (lamp holders). For bulbs powered by AC current, the thread is generally connected to neutral and the contact on the bottom tip of the base is connected to the "live" phase.

In North America and continental Europe, Edison screws displaced other socket types for general lighting. In the early days of electrification, Edison screws were the only standard connector, and appliances other than light bulbs were connected to AC power via lamp sockets. Today Edison screw sockets comply with international standards. Specifications for all lamp mount types are defined by the American National Standards Institute (ANSI) and International Electrotechnical Commission (IEC) publications, such as ANSI C81.61, C81.62, C81.63, and C81.64, as well as IEC 60061-1, 60061-2, 60061-3, and 60061-4, respectively.

Generally, the two standards are harmonized, although several types of screw mount are still defined in only one standard. In the designation "Exx", "E" stands for "Edison" and "xx" indicates the diameter in millimeters as measured across the peaks of the thread on the base (male), e.g., E12 has a diameter of 12 mm. This is distinct from the glass envelope (bulb) diameter, which in the U.S. is given in eighths of an inch, e.g., A19, MR16, T12. There are four commonly used thread size groups for mains supply lamps: Candelabra—E12 in North America, E11 in Europe; Intermediate—E17 in North America, E14 (Small ES, SES) in Europe; Medium or standard—E26 (MES) in North America, E27 (ES) in Europe; and Mogul—E39 North America, E40 (Goliath ES) in Europe. The E26 and E27 are usually interchangeable, although there is a 1 mm difference in thread outside diameter, but there is no difference in pitch.

A non-contact voltage tester may be used to check if a lightbulb socket is live, however the tool may be difficult to align, and the user may prefer for the lightbulb socket to hold the voltage tester in place while conducting the test. This could allow for a user, in a scenario where there are a number of light switches, to then try differing switches. Or provide a user the opportunity for switching off different circuit breakers to ensure the line is dead before attempting any service work. The following disclosure attempts to address such a desire with a novel solution.

SUMMARY

One aspect of this disclosure is directed to an adapter for a hand-held non-contact voltage tester. In this aspect, a body defines a longitudinal aperture that is configured to be disposable over one end of a hand-held non-contact voltage tester. This aspect also teaches of a first engagement feature configured to at least partially couple with a hand-held non-contact voltage tester, and a second engagement feature configured to couple with a female Edison screw.

In this aspect, the first engagement feature may have a ledge. The ledge may extend inwardly from the body. The ledge may also extend substantially orthogonal to the longitudinal aperture. The body may further define a longitudinal axis and the first engagement feature may be at least one protrusion elastically deformable transversely to the longitudinal axis. In this aspect, the protrusion may have an engagement surface substantially orthogonal to the longitudinal axis. Additionally, there may be two opposing protrusions across the longitudinal axis.

The second engagement feature may extend outwardly from the body. The body may further define a longitudinal axis and the second engagement feature may be at least one elastically deforming outwardly projecting protrusion. There may be two opposing protrusions across the longitudinal axis. Or there may be two pair of opposing protrusions across the longitudinal axis. Alternatively, the second engagement feature may be a male Edison screw.

Another aspect of this disclosure is directed to a removable lightbulb socket adapter for a hand-held non-contact voltage tester. In this aspect, a first engagement feature is configured to at least partially couple with a hand-held non-contact voltage tester. Additionally, a second engagement feature is configured to be at least partially disposed within a lightbulb socket.

In this aspect, the first engagement feature may be configured to be at least partially disposable over a hand-held non-contact voltage tester. The first engagement feature may be a pair of transverse elastically deforming protrusions opposite each other configured to couple with opposing sides of a hand-held non-contact voltage tester.

Also with this aspect, the second engagement feature may be a male Edison screw. Alternatively, the second engagement feature may be at least one protrusion configured to couple with a female Edison screw.

The lightbulb socket adapter may have a substantially circular body defining a longitudinal axis. The body may define an aperture configured to be disposable over an end of a hand-held non-contact voltage tester. The first engagement feature may be configured to couple with substantially parallel opposing sides of a hand-held non-contact voltage tester. The second engagement feature may be at least one protrusion extending radially outwardly from the circular body.

A further aspect of this disclosure is directed to a non-contact electrical tester having a hand-held elongate casing member with a first end, a sensor at least partially disposed in the first end, and a circuit and indicator. In this aspect, the circuit is at least partially disposed within the casing member, and is in conjunction with the sensor and indicator to, when the sensor is placed within a proximity of an alternating current, provide an indication of the presence of the alternating current. An engagement feature proximate the protrusion is also disclosed that is configured to engage with a non-conductive structure of a lightbulb socket. In this teaching, the engagement feature may be detachably removable from the detector.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
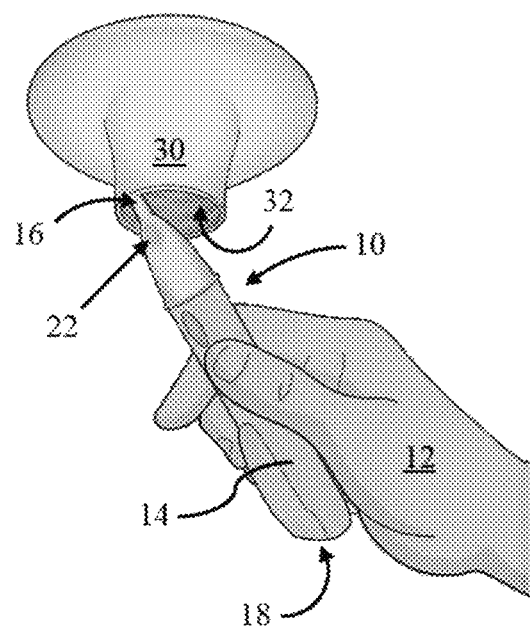
FIG. 1 is a diagrammatic illustration of a hand-held non-contact voltage tester being held by a hand in a lightbulb socket.

FIG. 1 shows a non-contact voltage tester 10 being held by a hand 12. The tester 10 has hand-held elongate casing member 14 having a first end 16 and a second end 18. The second end is configured to be held by the hand 12 of a user. In at least a portion of the first end 16 is a sensor (not shown). The sensor is electrically connected to a circuit (not shown), which in turn is also connected to an indicator 22. The circuit is at least partially disposed within the casing member 14, and in conjunction with the sensor are configured to, when the sensor (or more specially the portion of the first end 16 that the sensor resides) is placed within a proximity of an alternating current electrical power source, provide an indication via the indicator 22 of the presence of the alternating current. This may be done by illuminating the indicator 22 when an AC source is encountered. Some testers 10 may utilize an audible device as the indicator 22, such as a buzzer. In FIG. 1, the first end 16 is being placed into a lightbulb socket 30. This lightbulb socket 30 is shown having a female Edison screw 32.

Figure 2:
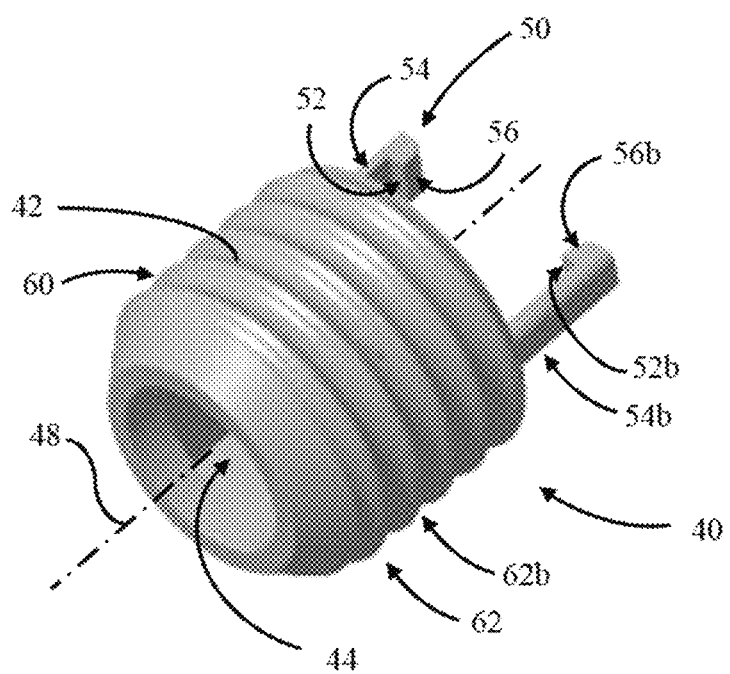
FIG. 2 is a perspective view of one embodiment of a removable lightbulb socket adapter for a hand-held non-contact voltage tester.

FIG. 2 is a perspective view of one embodiment of a removable lightbulb socket adapter 40 for a hand-held non-contact voltage tester 10, similar to the one shown in FIG. 1. This adapter 40 is configured to be held in a lightbulb socket 30, similar to the one shown in FIG. 1. Adapter 40 has a body 42, and as shown here may be a substantially circular body 42. Substantially, as used here, means that it does not have to be perfectly circular, rather that it is circular, but could be ovular or any shape that can provide a structural member for the further needed elements to provide adaptation an holding of a non-contact voltage tester 10 in a lightbulb socket 30. Adapter 40 is also shown here as a single unitary body, although it is envisioned that adapter 40 may comprise multiple components.

Figure 3:
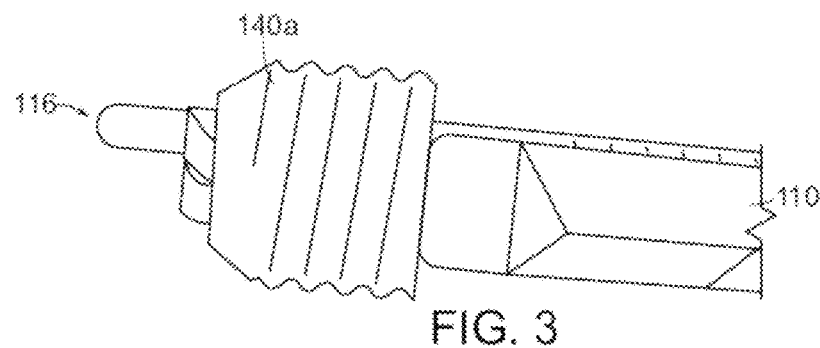
FIG. 3 is a partial side view of a non-contact voltage tester with a lightbulb socket adapter at least partially disposed over one end of the tester.

Body 42 defines an aperture 44. The aperture 44 may be surrounded by the body 42 around the entire perimeter of the aperture, as shown, or it has been envisioned that the body 42 may be non-continuous around the perimeter of the aperture 44. The body 42 defines a longitudinal direction as shown by a longitudinal axis 48. In the case of a circular body 42, the longitudinal axis 48 may be an axis 48 thru the center of the aperture 44. In the case of a non-circular body, or a non-continuous body, the longitudinal axis 48 may be thru a centroid of the aperture 44. Aperture 44 is configured to be disposable over one end 16 of a hand-held non-contact voltage tester 10 (see FIG. 3), or said another way the adapter 40 is configured to at least partially couple with a hand-held non-contact voltage tester 10 (FIG. 3).

Adapter 40 has a first engagement feature 50. The first engagement feature 50 is configured to at least partially couple with a hand-held non-contact voltage tester 10, similar to the tester in FIG. 1. Engagement feature 50 has a ledge 52. Ledge 52 extends radially inwardly from the body 42. Ledge 52 is substantially orthogonal to the longitudinal axis 48. Alternatively, ledge 52 may extend substantially transversely to the longitudinal aperture 44.

In this embodiment, the engagement feature 50 has an arm 54 that extends longitudinally from the body 42 ending with the ledge 52 extending transversely inwardly. The arms 54 allow for an elastic deformation to occur allowing for the engagement feature 50 to ride along a side of a tester 10 and engage with a catch (not shown) on the tester 10. The adapter 40, as shown here, has two opposing arms 54, 54*b* longitudinally extending from the body 42. Each arm 54, 54*b* ending with an inwardly projecting protrusion 56, 56*b* providing the transverse ledges 52, 52*b*. This is one embodiment that allows for at least one elastically deforming inwardly projecting protrusion 56, and as shown here is two opposing protrusions 56,56*b* across the longitudinal axis 48. Yet another way to explain such an engagement feature 50 is a pair of transverse elastically deforming protrusions 56, 56*b* opposite each other configured to couple with opposing sides of a hand-held non-contact voltage tester 10.

In one embodiment, a second engagement feature 60 is configured to couple a hand-held non-contact voltage tester 10 with a lightbulb socket 30, such as those shown in FIG. 1. In another embodiment, the second engagement feature 60 is configured to be at least partially disposed within a lightbulb socket 30. And in yet another embodiment, the second engagement feature 60 is configured to couple with a female Edison screw 32.

The second engagement feature 60 extends outwardly from the body 42. The second engagement feature 60 is at least one protrusion 62 extending radially outwardly from the circular body 42. The second engagement feature 60 is at least one protrusion 62 configured to couple with a female Edison screw 32, such as that shown in FIG. 1. The second engagement feature 60, as shown here, is a male Edison screw 62*b*.

Figure 4:
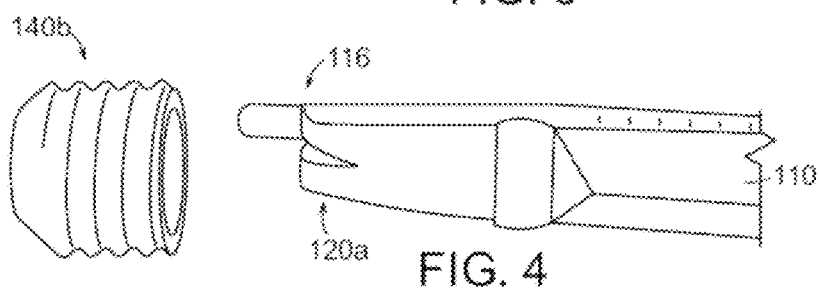
FIG. 4 is a partial side view of a non-contact voltage tester with a removable lightbulb socket adapter removed from one end of the tester.
Figure 5:
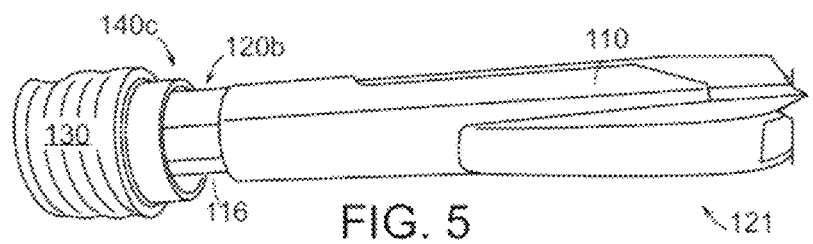
FIG. 5 is a partial side view of a non-contact voltage tester with a lightbulb socket adapter at least partially disposed over one end of the tester and coupled with a lightbulb socket.

FIG. 3 is a partial side view of a non-contact voltage tester 110 with a lightbulb socket adapter 140*a* at least partially disposed over one end 116 of the tester 110. FIG. 4 is a partial side view of the same non-contact voltage tester 110 from FIG. 3, with a removable lightbulb socket adapter 140*b* removed from the one end 116 of the tester 110. FIG. 5 is a partial side view of the non-contact voltage tester 110 of FIGS. 3 and 4, with a lightbulb socket adapter 140*c* at least partially disposed over the one end 116 of the tester 110 and coupled with a lightbulb socket 130. The adapters 140*a*, 140*b*, 140*c* are configured to be at least partially disposable over a hand-held non-contact voltage tester 110. The adapters 140*a*, 140*b*, 140*c* are configured to couple with substantially parallel opposing sides 120*a*, 120*b* of a hand-held non-contact voltage tester 110. For example, many hand-held non-contact voltage testers 110 have a pen clip 121, as shown in FIG. 5. If the pen clip 121 side represents a top side, then the substantially parallel opposing sides 120*a*, 120*b* could be the left and right sides of the tester 110.

It is envisioned, that a hand-held non-contact voltage tester 110, such as that shown in FIG. 3, has an adapter 140*a* that is formed in as part of the end 116 of the tester 110 and is not removable. Of course in this embodiment there would be no need for a first engagement feature 50 as it be integral.

Figure 6:
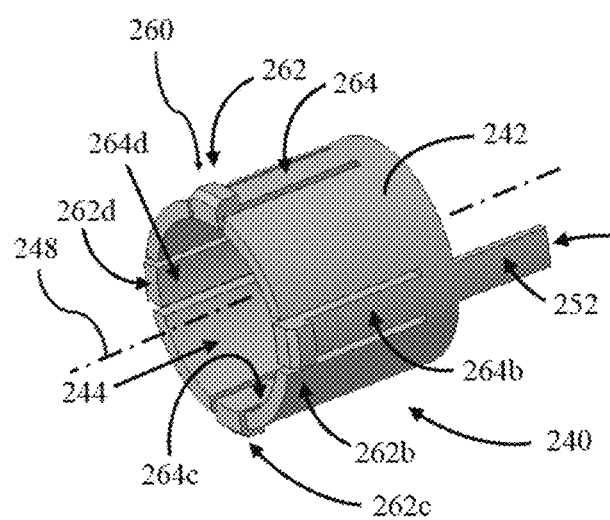
FIG. 6 is a perspective view of another embodiment of a lightbulb socket adapter for a hand-held non-contact voltage tester.
Figure 7:
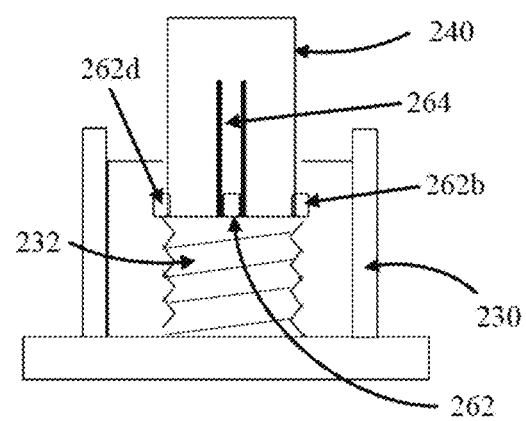
FIG. 7 is a diagrammatic cross-sectional illustration of a lightbulb socket adapter similar to that seen in FIG. 6 being inserted into a lightbulb socket with a female Edison screw.

FIG. 6 shows a perspective view of another embodiment of a lightbulb socket adapter 240 for a hand-held non-contact voltage tester 10, 110, similar to the ones shown in FIGS. 1, 3, 4, and 5. FIG. 7 shows a diagrammatic cross-sectional illustration of the lightbulb socket adapter 240 of FIG. 6 being inserted into a lightbulb socket 230 with a female Edison screw 232. This adapter 240 is configured to be held in a lightbulb socket 230

Referring back to FIG. 6, adapter 240 has a body 242, and as shown here may be a substantially circular body 242. Substantially, as used here, means that it does not have to be perfectly circular, rather that it is circular, but could be ovular or any shape that can provide a structural member for the further needed elements to provide adaptation an holding of a non-contact voltage tester 10, 110 in a lightbulb socket 30, 130, 230.

Body 242 defines an aperture 244. The aperture 244 may be surrounded by the body 242 around the entire perimeter of the aperture, as shown, or it has been envisioned that the body 242 may be non-continuous around the perimeter of the aperture 244. The body 242 defines a longitudinal direction as shown by a longitudinal axis 248. In the case of a circular body 242, the longitudinal axis 248 may be an axis thru the center of the aperture 248. In the case of a non-circular body, or a non-continuous body, the longitudinal axis 248 may be thru a centroid of the aperture 244. Aperture 244 is configured to be disposable over one end 16, 116 of a hand-held non-contact voltage tester 10, 110 (see other FIGS.), or said another way the adapter 240 is configured to at least partially couple with a hand-held non-contact voltage tester 10, 110.

Adapter 240 has a first engagement feature 250. The first engagement feature 250 is configured to at least partially couple with a hand-held non-contact voltage tester 10, 110. Engagement feature 250 may have an arm 254 that extends longitudinally from the body 242. The arm 254 may allow for an elastic deformation to occur allowing for the engagement feature 250 to ride along a side of a tester 10, 110 and aid in the orientation of adapter 240 on the tester 10, 110.

In this embodiment, a second engagement feature 260 is configured to couple a hand-held non-contact voltage tester 10, 110 with a lightbulb socket 30, 230 such as those shown in other Figures. The second engagement feature 260 extends outwardly from the body 242. The second engagement feature 260 is at least one protrusion 262 extending radially outwardly from the circular body 242. The second engagement feature 260 is at least one protrusion 262 configured to couple with a female Edison screw 232, such as that shown in FIG. 7. The second engagement feature 260 is at least one elastically deforming outwardly projecting protrusion 262. The second engagement feature 260 may be two opposing protrusions 262, 262*b* across the longitudinal axis, or, as shown here, may be two pair of opposing protrusions 262, 262*b*, 262*c*, 262*d* across the longitudinal axis 248.

Protrusion 262 is at the end of limb 264. Each protrusion 262*b*, 262*c*, 262*d* may be located at a respective end of each Limb 264*b*, 264*c*, 264*d*. Each limb may be formed by slotting the body 242. The design of slotted sections of the body 242 provide for elastically deformable limbs 264, 264b, 264c, 264d. Or said another way, the protrusions 262, 262b, 262c, 262d may be referred to as elastically deformable.

Referring now to FIG. 7, as the adaptor 240 is inserted into the lightbulb socket 230, the elastically deformable protrusions 262,262b, 262c will contact the female Edison screw 232 crests, allowing for the protrusions to elastically deform radially inwardly as the protrusions 262, 262b, 262c fall into the roots of the screw and the adapter 240 clicks down into the socket 230. The limb 264 springs the protrusion 262 back into the crest of the screw 232 and holds the adapter 240 within the socket 230. The adapter 240 may also be screwed in and out of position, but the slotted limbs 264 allow for quick insertion and engagement with the female Edison screw 232.

Adapter 242 may be made from a single unitary body with the slots forming the limbs 264 running longitudinally along the body 242 more than half of the longitudinal length of the body 242. Protrusions 262 may be straight, tapered, or triangular to match the pitch, slope, or thread angle of the screw 262. A set of three adaptors with differing radii of each body 242, and differing engagement protrusions 262 for the pitch, slope, depth, or thread angle may be employed for the female Edison screws of the candelabra, standard, and mogul (Goliath ES) lightbulb sockets.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An adapter for a hand-held non-contact voltage tester, comprising:
   a body defining a longitudinal axis and a longitudinal aperture configured to be disposable over one end of a hand-held non-contact voltage tester;
   a first engagement feature configured to at least partially couple with a hand-held noncontact voltage tester, the first engagement feature is at least one protrusion elastically deformable transversely to the longitudinal axis and having an engagement ledge substantially orthogonal to the longitudinal axis; and
   a second engagement feature configured to couple with a female Edison screw.

2. The device of claim 1, wherein the at least one protrusion elastically deformable transversely to the longitudinal axis are two opposing protrusions across the longitudinal axis.

3. The device of claim 1, wherein the second engagement feature extends outwardly from the body.

4. The device of claim 1, wherein the second engagement feature is at least one elastically deforming outwardly projecting protrusion.

5. The device of claim 4, wherein the at least one elastically deforming outwardly projecting protrusion are two opposing protrusions across the longitudinal axis.

6. The device of claim 4, wherein the at least one elastically deforming outwardly projecting protrusion are two pair of opposing protrusions across the longitudinal axis.

7. The device of claim 1, the second engagement feature is a male Edison screw.

8. A removable lightbulb socket adapter for a hand-held non-contact voltage tester, comprising:
   a first engagement feature comprising a pair of transverse elastically deforming protrusions opposite each other configured to be at least partially disposable over and couple with opposing sides of a hand-held noncontact voltage tester; and
   a second engagement feature configured to be at least partially disposed within a lightbulb socket.

9. The device of claim 8, wherein the second engagement feature is a male Edison screw.

10. The device of claim 8, wherein the second engagement feature is at least one protrusion configured to couple with a female Edison screw.

11. The device of claim 8 further comprising a substantially circular body defining a longitudinal axis.

12. The device of claim 11, wherein the body defines an aperture configured to be disposable over an end of a hand-held non-contact voltage tester.

13. The device of claim 11, wherein the first engagement feature is configured to couple with substantially parallel opposing sides of a hand-held non-contact voltage tester.

14. The device of claim 11, wherein the second engagement feature is at least one protrusion extending radially outwardly from the circular body.

15. An adapter for a hand-held non-contact voltage tester, comprising:
   a body defining a longitudinal axis and a longitudinal aperture configured to be disposable over one end of a hand-held non-contact voltage tester;
   a first engagement feature configured to at least partially couple with a hand-held noncontact voltage tester; and
   a second engagement feature is at least one elastically deforming outwardly projecting protrusion configured to couple with a female Edison screw.

16. The device of claim 15, wherein the at least one elastically deforming outwardly projecting protrusion are two opposing protrusions across the longitudinal axis.

17. The device of claim 15, wherein the at least one elastically deforming outwardly projecting protrusion are two pair of opposing protrusions across the longitudinal axis.

18. The device of claim 15, wherein the elastically deforming outward projection further comprises a limb connectably extending from the outwardly projecting protrusion to the body, providing the protrusion at one end of the limb and connecting the the body at the other end of the limb, and the elasticity of the limb provides the elastical deformation of the outwardly protruding projection.

19. The device of claim 18, wherein the limb is formed by slotting the body.

20. The device of claim 15, wherein the body further defines a longitudinal axis and the first engagement feature is at least one protrusion elastically deformable transversely to the longitudinal axis and having an engagement ledge substantially orthogonal to the longitudinal axis.

* * * * *